(12) United States Patent
Gelardi, II et al.

(10) Patent No.: US 11,944,078 B1
(45) Date of Patent: Apr. 2, 2024

(54) METERING AND DISPENSING CONTAINER

(71) Applicants: Anthony Gelardi, II, Arundel, ME (US); Anthony L. Gelardi, Cape Elizabeth, ME (US)

(72) Inventors: Anthony Gelardi, II, Arundel, ME (US); Anthony L. Gelardi, Cape Elizabeth, ME (US)

( * ) Notice: Subject to any disclaimer, the term of this patent is extended or adjusted under 35 U.S.C. 154(b) by 577 days.

(21) Appl. No.: 16/502,508

(22) Filed: Jul. 3, 2019

Related U.S. Application Data

(60) Provisional application No. 62/693,659, filed on Jul. 3, 2018.

(51) Int. Cl.
*A01K 5/02* (2006.01)
*A01K 15/02* (2006.01)

(52) U.S. Cl.
CPC .......... *A01K 5/0233* (2013.01); *A01K 15/026* (2013.01)

(58) Field of Classification Search
CPC .... A01K 5/0144; A01K 5/0233; A01K 5/025; A01K 15/025; A01K 15/026
See application file for complete search history.

(56) References Cited

U.S. PATENT DOCUMENTS

| | | | |
|---|---|---|---|
| 6,158,391 A | 12/2000 | Simonetti | |
| 6,722,317 B2 | 4/2004 | O'Rourke | |
| 6,886,739 B1 | 5/2005 | Tsengas | |
| 6,983,722 B2 | 1/2006 | Tepper | |
| 7,389,748 B2 * | 6/2008 | Shatoff | A01K 29/00 119/707 |
| 7,591,234 B2 | 9/2009 | Shatoff | |
| 8,141,521 B2 | 3/2012 | Shatoff | |
| 8,516,977 B2 | 8/2013 | Shatoff | |
| 8,746,182 B2 * | 6/2014 | Anderson | A01K 29/00 119/710 |
| 8,919,290 B2 | 12/2014 | Ottosson | |
| 2014/0000521 A1 | 1/2014 | Shatoff | |

* cited by examiner

*Primary Examiner* — Joshua J Michener
*Assistant Examiner* — Henry Hooper Mudd
(74) *Attorney, Agent, or Firm* — Cermak Nakajima & McGowan LLP; James Creighton Wray

(57) ABSTRACT

A metering dispenser for pet products and other products has a container and a tunnel within the container. The tunnel has a product receiving opening near an internal wall of the container and a dispensing opening extending through an opposite wall. When the container is moved, products fall into the receiving opening, through the tunnel and out through the dispensing opening. Pet product ingestion is extended and pets learn to manipulate the container to obtain food and treats.

4 Claims, 13 Drawing Sheets

A Metering & Dispensing Container

As the Container is manipulated the metered treats find their way down the tunnel The size of the Exit Tunnel can meter how many treats are dispensed

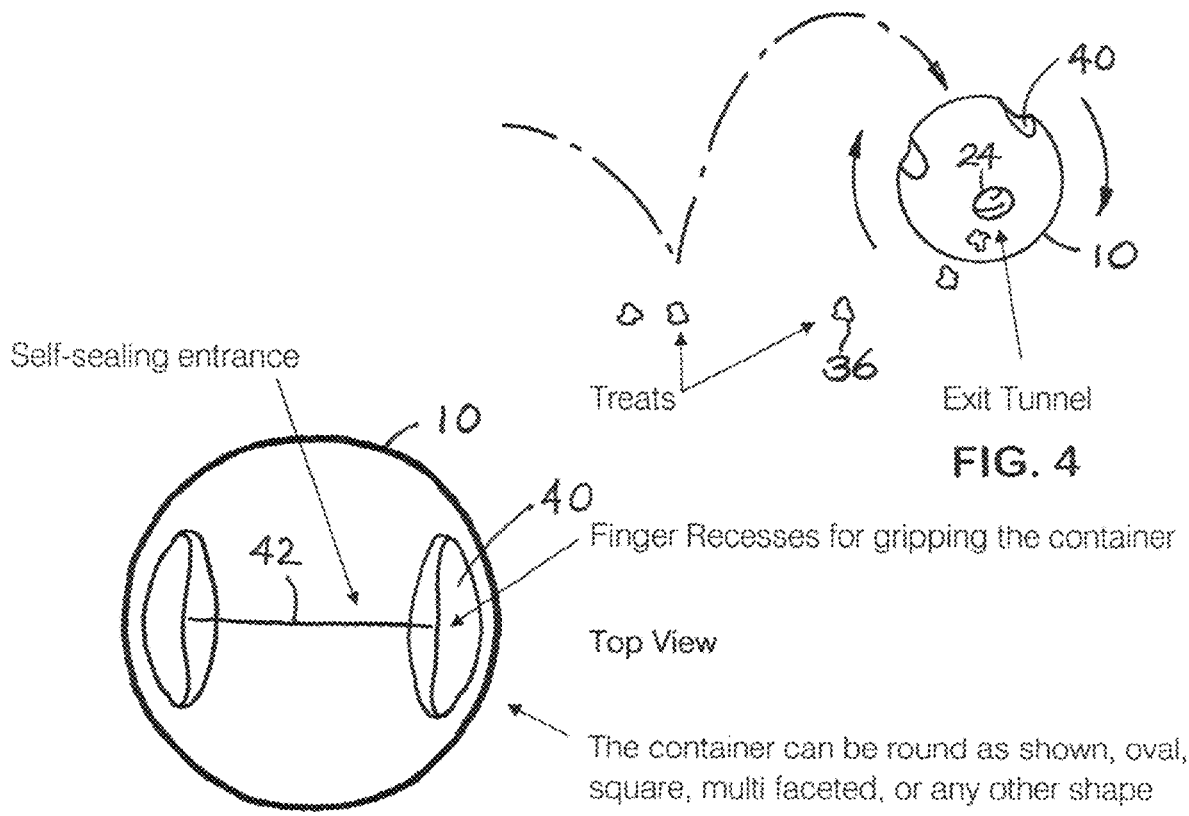
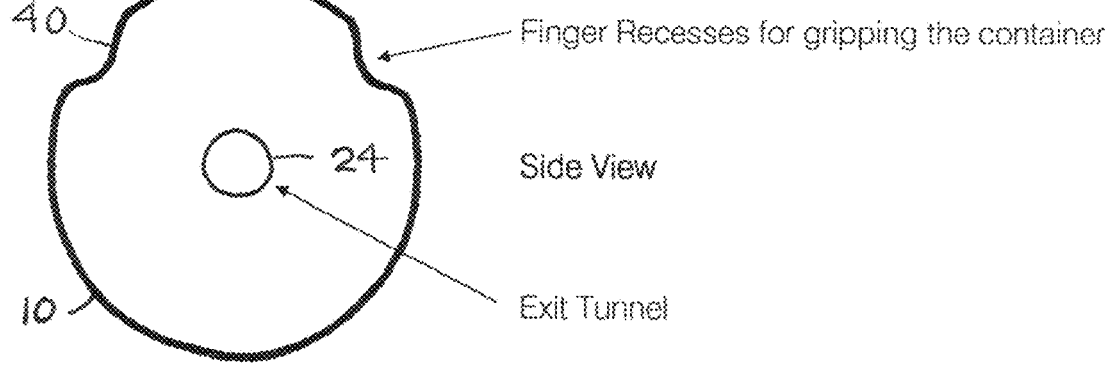

A Metering & Dispensing Container

Self-sealing entrance that only opens when the container is compressed

Finger Recess

FIG. 7

A Rubber Like Material

Using the finger recesses compress the container to easily open

The container can be opened without using the finger recesses

A Metering & Dispensing Container

A METERING & DISPENSING CONTAINER

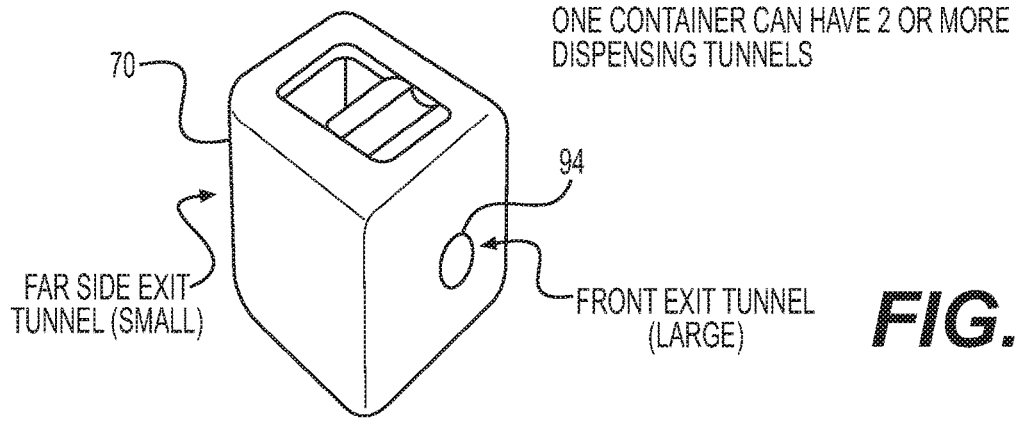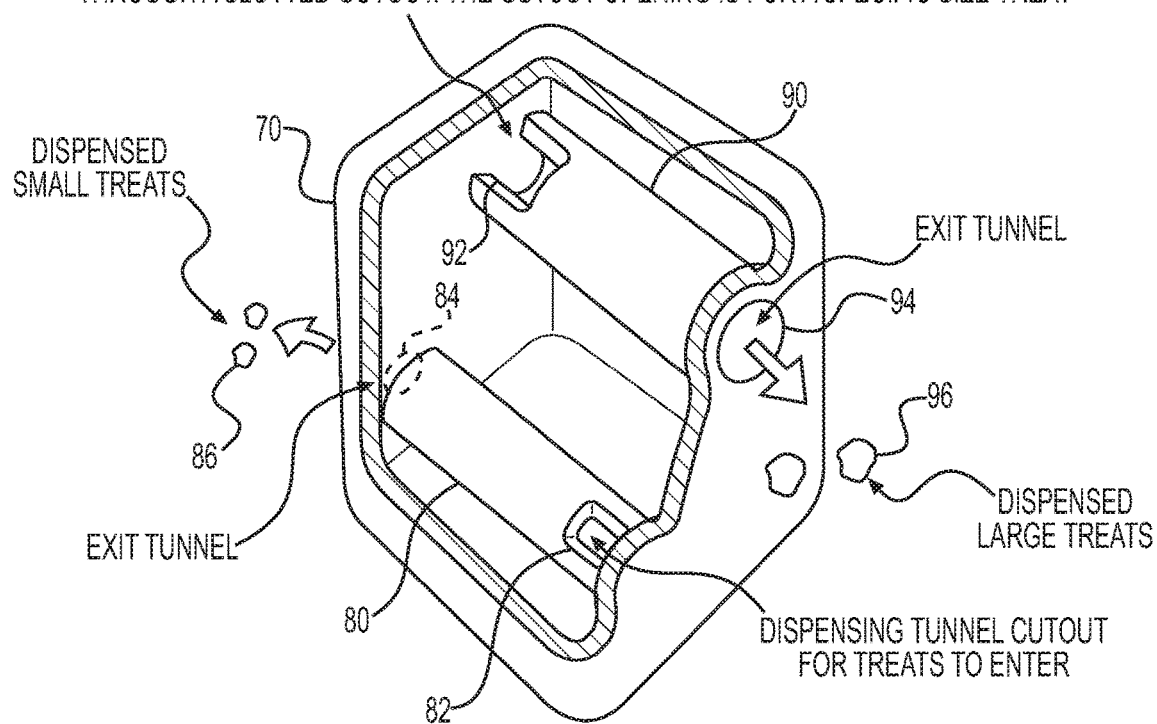

| Dog Weight (lbs) | Portions/Day (cups) | Portions/Day (grams) | Portions/Day (lbs) |
|---|---|---|---|
| 5 | 0.5 | 65 | 0.14 |
| 10 | 0.75 | 100 | 0.16 |
| 20 | 1.25 | 180 | 0.4 |
| 40 | 2.25 | 305 | 0.66 |
| 60 | 3 | 410 | 0.9 |
| 80 | 3.66 | 510 | 1.1 |
| 100 | 4.5 | 610 | 1.34 |

FIG. 21

METERING AND DISPENSING CONTAINER

This application claims the benefit of U.S. Provisional Application No. 62/693,659 filed Jul. 3, 2018, which is hereby incorporated by reference in its entirety as if fully set forth herein.

SUMMARY OF THE INVENTION

An enclosed dispenser to hold pet food-like kibble that incorporates one or more passageways that originate from the container outer surface and extend into the container with an inner, fixed or adjustable opening that regulates the amount of pet food that enters the passageway and dispenses out of the container when rolled, flipped, bounced or dropped.

The dispenser can be filled through a self-sealing opening, unscrewing halves, plug or other methods.

The dispenser can be made in one or more parts from ridged or compressible materials.

The dispenser can be made of clear material so the amount of pet kibble can be monitored (full, partial to empty).

A container has an interior tunnel leading from an inner opening to an outer opening. The tunnel has an interior opening inside the container to allow its contents to move into the tunnel.

When the container moves, objects in the container enter the tunnel or leave the tunnel, or both.

One or more tunnels in the container can dispense contents slowly upon rotating the container. More than one tunnel may have different dimensions for dispensing different sized objects from the container. Each tunnel may have one or more inner openings within the container to load the contents of the container in the tunnels through the inner openings.

The inner openings may be controllable in size, such as by twisting a sleeve to partially close or fully open a lateral inner opening of the tunnel. Alternatively a cover may be slid longitudinally or axially along a tunnel to control the amount of objects falling into the tunnel from the interior of the container. The tunnels are made longer or shorter to place the inner ends of the tunnels closer to or further from the inner walls of the containers, thereby restricting the flow of objects into the tunnel as the container is moved.

An inner wall of the container may be recessed opposite an inner opening of the tunnel to aid flow of objects into the tunnel.

The controlled dispensing container may be useful to meter the distribution of treats, candy or toys to humans or animals.

The new product in appropriate sizes of containers and tunnels can be used in place of piriatas at parties and celebrations for timed and controlled distribution of candies and objects.

The container has the integral metering and dispensing tunnel and a self-sealing opening that opens when compressed from both ends, allowing objects to be inserted in the container. When released the treat insertion opening of the container self-seals.

One use is as a metering device for pets to control and prolong consumption of kibble or treats. In this example, a pet learns that by rolling, dropping, or bouncing the container, one or more treats or kibble may be dispensed. The metering is accomplished by controlling the space between the inner open end of the tunnel and the opposing inner wall of the container. The space is slightly larger than the longest side, diameter or dimension of the treat or kibble. When a treat or kibble locates between the tube tunnel inner opening and the opposing wall, and the container is moved or rotated, one or more treats or kibble will pass through the tube tunnel and will dispense from the container. This can continue until all the treats or kibble have been dispensed. The pet can sense that the treat or kibble container is empty by the lack of smell and by the lack of sound of treats or kibble tumbling inside.

Different sized containers can be made to match the treat or kibble portions prescribed for a dog's size and weight. The container may hold a portion of or a complete daily ration of food.

Dogs have a tendency to gulp their food quickly to deter the attempts of their competitors to take it from them. This act of gulping can be dangerous for dogs, especially for the deep barrel chested breeds that are prone to a potentially fatal condition known as "bloat" or as gastric dilatation and *volvulus* (GDV).

Engaging a pet to work for its meal or snack extends the feeding time, while occupying attention as the dog satisfies its appetite through play.

Pet Treat metering and dispensing containers have closable filling openings or self-sealing filling mouth if made from rubber-like materials.

Briefly, hollow containers, round, cylindrical, oval, cube or other shape incorporates a metering dispenser for dispensing pet treats when rolled, flipped, bounced or manipulated.

The pet treat dispensers include one or more open-ended tubes projecting from an outside wall, through the wall, and terminating at a set distance from the inner opposing surface. The distance is determined by being slightly larger than the largest treat. The number of treats per cycle is determined by the size of the inside of the tube.

The containers can be made to contain a full daily portion based on the size and weight of the pet. As only several treats can be dispensed at a time, the pet is occupied for extended periods before all the treats are consumed.

The containers can be made of a clear material allowing the owner and pet to monitor the remaining treat level. The clear metering and dispensing containers can include calibration lines or text to allow for exact volumes.

If the container is made from rubber-like material, the treats can be inserted through a self-sealing mouth that opens when compressed from both ends and closes and seals when released.

The pet learns by rolling, flipping, dropping or manipulating. Several treats will dispense and drop out of the container, extending the pet's play and reward time.

If the container is made from rigid material, a filling opening is incorporated with a cap to seal the container.

A product container has an exterior and an interior. A dispensing tunnel extends through and within the container. The tunnel has an open outer end with a dispensing opening. An inner opening in the tunnel within the container receives and flows products from within the container into the tunnel. When the container is in motion products within the container move into the tunnel through the inner product receiving opening. When the container is moved products move within the tunnel and flow through the dispensing opening and out of the container.

The inner opening is adjustable and the container is openable for adjusting the inner opening.

The container has a filling opening extending from the exterior to the interior of the container for filling the container with products and has a closure for closing the filling opening.

In one embodiment, the container has more than one dispensing openings and the container has more than one tunnels connected to the dispensing openings. The more than one inner openings have adjustable closures for the inner openings, and the container has an access to the adjustable disclosures.

A dispensing container has walls with an inner side and an outer side. A tunnel is fixed within the dispensing container. The tunnel has an outer dispensing opening extending from or through the walls of the dispensing container and through the inner side and the outer side of the walls. The tunnel has an inner receiving opening adapted for filling the tunnel from contents of the container when the container is placed in motion. Contents from the tunnel are dispensed by falling from the outer dispensing opening of the tunnel when the container is placed in motion.

The tunnel extends across the container and the receiving opening of the tunnel is placed near and spaced from an inner side of a wall of the container. A portion of the walls on the inside of the container is recessed opposite the receiving opening of the tunnel. Leaving a space between a portion of the walls of the container and the receiving opening of the tunnel allows the contents of the container to flow through the space and into the receiving opening of the tunnel.

A movable gate is positioned in the container near the receiving end of the tunnel. The gate has a complementary opening cooperating with the receiving opening to control a size of a lumen formed by the receiving opening in the tunnel and the complementary opening of the gate.

A lateral or radial opening near the receiving opening of the tunnel has a movable cover with a cover opening adapted for cooperating with the lateral or radial opening. Moving the movable cover controls a size of a lumen by moving the cover relative to the tunnel.

In one form the cover is a door slidable along the tunnel and partially covering and uncovering the lateral or radial opening.

In another embodiment the tunnel is cylindrical, and the cover is a cylindrical sleeve turnable on the cylindrical tunnel near the receiving opening. The sleeve has a complementary opening adapted for partially or fully opening a lumen between the radial or lateral opening in the tunnel and the complementary opening in the sleeve. In an embodiment the container has more than one dispensing tunnel within the container.

The invention provides a method comprising dispensing products from a hollow container. A closable filing opening in the container is provided for filling the container. A tunnel extends in the container, providing a receiving opening in an end of the tunnel within the container. A dispensing opening is provided in an end of the tunnel emerging from the container. Products are placed in the container through the closable filling opening. Moving the container flows products from the container through a receiving opening into the tunnel. Further moving the container dispenses products from the tunnel through the dispensing opening.

Opening the closable opening and moving a cover over at least a part of the receiving opening controls the flowing of products through the receiving opening into the tunnel upon moving the container.

The receiving opening further has a lateral or radial opening. Moving the cover over at least part of the lateral or radial opening controls flow of the product into the tunnel These and further and other objects and features of the invention are apparent in the disclosure, which includes the above and ongoing written specification, with the claims and the drawings.

BRIEF DESCRIPTION OF THE DRAWINGS

FIG. 4 shows bouncing of the dispensing container to release treats or kibble.

FIG. 5 is top view showing finger recesses for gripping and opening the container.

FIG. 6 is a side view showing the finger recesses and tunnel exit.

FIG. 7 shows gripping the recesses.

FIG. 8 shows squeezing the recesses inward to open the container for filling.

FIG. 9 shows squeezing the container to open it.

FIG. 13 shows a cubed container with front and rear openings of tunnels having different diameters.

FIG. 14 is a partial cross section of the container shown in FIG. 13 with different sized tunnels, inner openings and outer lateral openings.

FIG. 21 is a chart of possible portions for dogs of different sizes.

DETAILED DESCRIPTION

Figure 1:
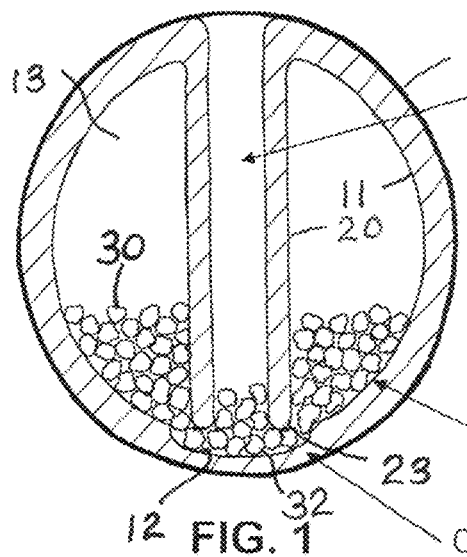
FIG. 1 is a cross-sectional view an example of the dispensing container showing kibble in an interior depression under an inner opening of an exit tunnel.

FIG. 1 is a cross-sectional view of the dispensing container 10 showing kibble 32 in an interior depression 12 under an opening of an exit tunnel 20. Metering and dispensing container 10 is formed of a rubber-like plastic material. An integrally formed dispensing tunnel 20 has an inner opening 23 spaced from an inner wall 11 of the container 10.

Figure 2:
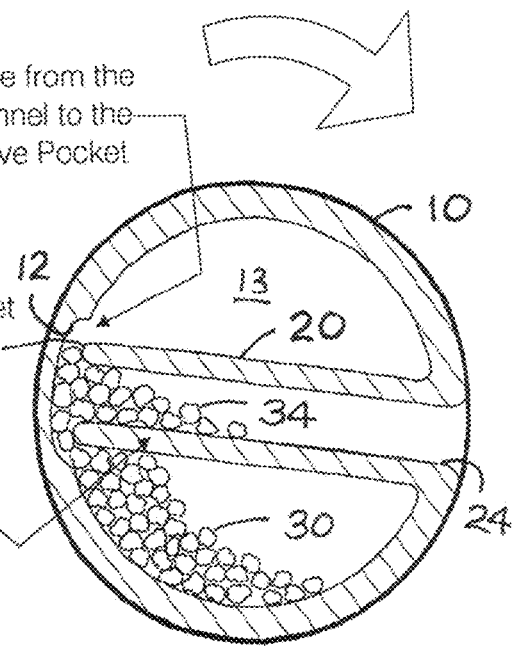
FIG. 2 is a cross-sectional view of the dispensing container showing a partial rotation of the dispensing container with some kibble beginning to travel through the exit tunnel.

FIG. 2 is a cross-sectional view of the dispensing container 10 showing a partial rotation of the dispensing container with some kibble 34 beginning to travel through the exit tunnel 20. The beveled edge 26 of the inner opening 23 of the dispensing tunnel 20 pushes additional kibble 30 away from the opening, releasing only a small amount of kibble 34 in the container with the dispensing tunnel 20.

Figure 3:
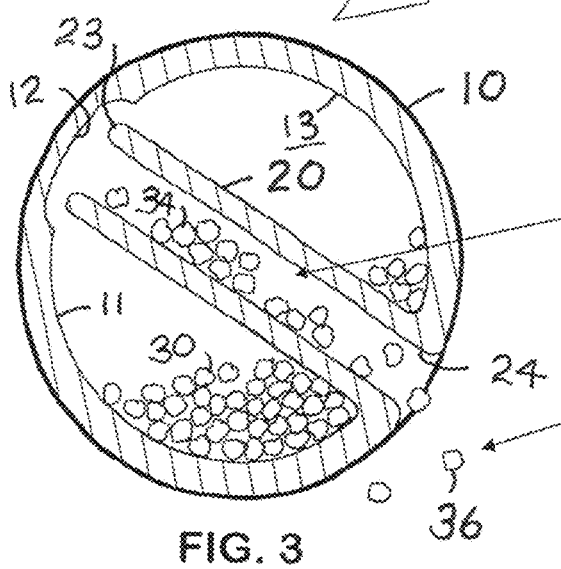
FIG. 3 is a cross-sectional view of the dispensing container showing a further rotation to begin releasing kibble from the tunnel.

FIG. 3 is a cross-sectional view of the dispensing container 10 showing a further rotation to begin releasing kibble 36 from the tunnel 20. Kibble or treats 34 travel from a concave pocket 12 below the dispensing tunnel and exit from the outer opening 24 of the dispensing tunnel 20.

FIG. 4 shows bouncing of the dispensing container to release treats or kibble. The dispensing container 10 rotates, and kibble or treats 30 exit at intervals from the dispensing tunnel 20.

FIG. 5 is top view showing finger recesses for gripping and opening the container. Finger recesses 40 formed of divots in a side of the container 10 that border the self-sealing opening 42. The finger recesses 40 provide the mechanism for opening of the self-sealing entrance 42. They also provide a space for the gripping of the container 10.

Figure 10:
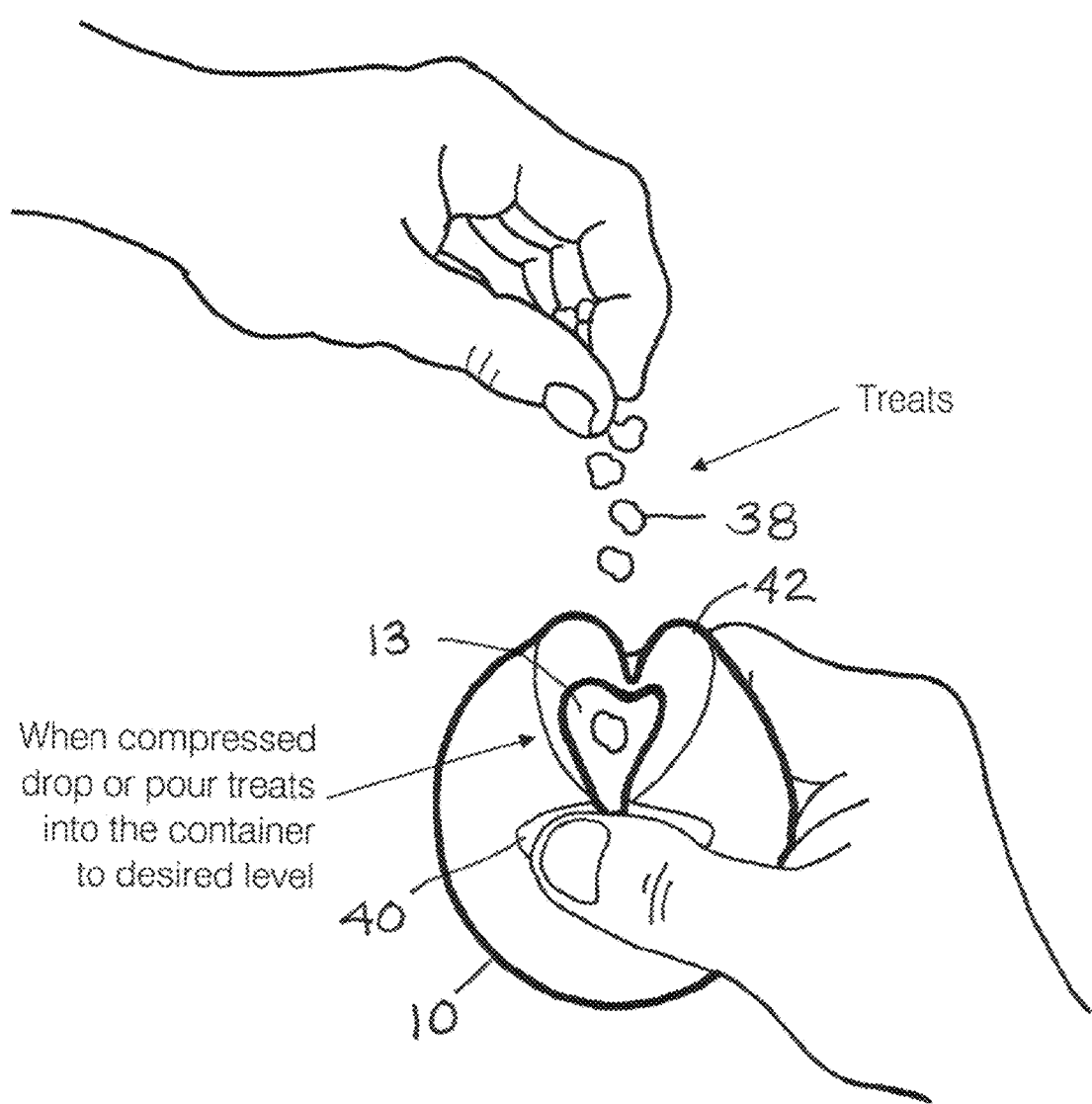
FIG. 10 shows filling the container with treats or kibble.

FIG. 6 is a side view showing the finger recesses and tunnel exit. The finger recesses 40 are divots in the container and extend in depth nearly, but not entirely, to the interior of the container as shown in FIG. 10.

FIG. 7 shows gripping the recesses. Gripping of the finger recesses 40 without inward pressure allows for the ball to be held, leaving the self-sealing filling opening 42 sealed. Gripping of the recesses with inwardly-applied pressure releases the self-sealing filling opening 42, as shown in FIG. 8.

FIG. 8 shows squeezing the recesses inward to open the container for filling. Inwardly-applied pressure opens the self-sealing filling opening 42 to reveal the interior 13 of the container 10. The self-sealing filling opening terminates at the finger recesses 40.

FIG. 9 shows squeezing the container 10 to open it. Squeezing of the container releases the self-sealing opening 42 and reveals the interior 13 of the container, in which kibble or treats can be inserted.

FIG. 10 shows filling the container with treats or kibble. With applied pressure, the self-sealing opening 42 opens, and treats or kibble 38 can be dispensed into the interior 13 of the container 10.

Figure 11:
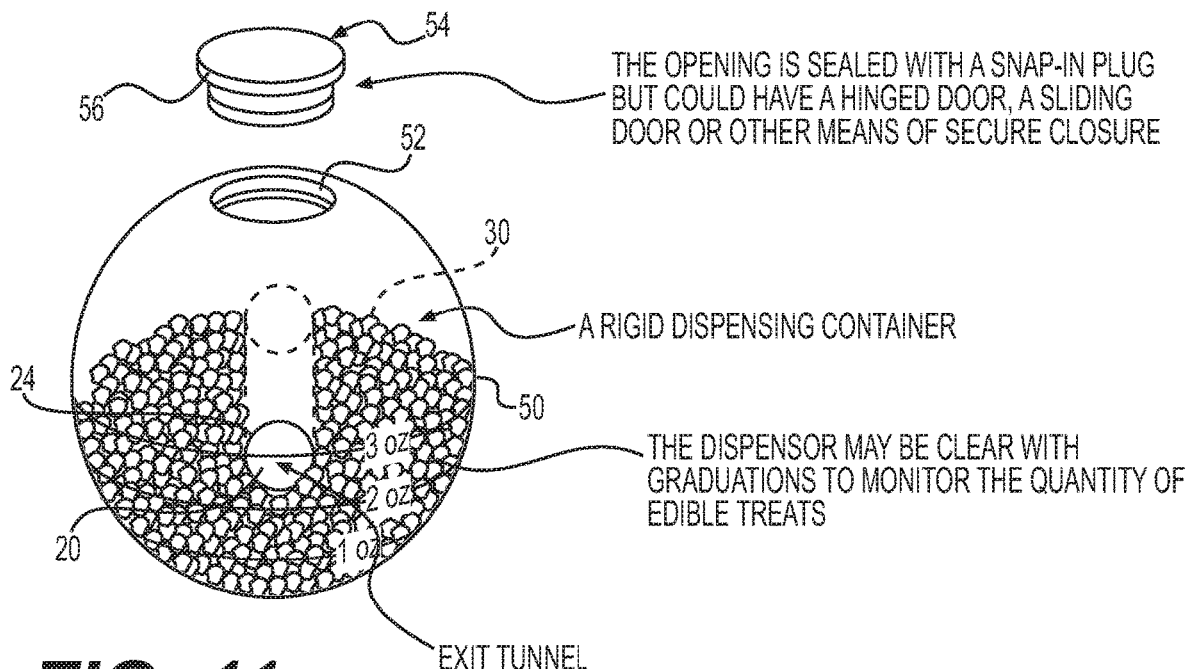
FIG. 11 shows a container with an opening closed by snap-in plug. The container has markings for indicating amounts within the container.

FIG. 11 shows a container 50 with an opening closed by snap-in plug 54. The container has a filling hole 52 wider in diameter than the outer opening 24 of the dispensing tunnel 20. The snap-in plug 54 has an exterior lip 56 larger than the filling opening 52, allowing for the secure closure of the container. The container 50 has markings 58 for indicating amounts within the container, allowing for the precise measurement of kibble or treats 30 to fill the container.

Figure 12:
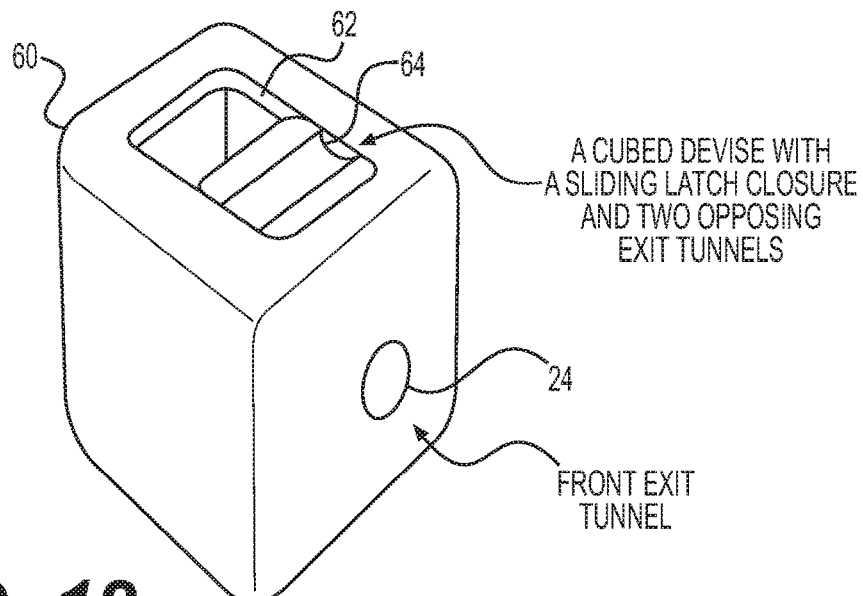
FIG. 12 shows a cubed container with a sliding hatch.

FIG. 12 shows a cubed container 60 with a sliding hatch 62. The sliding hatch 62 on a side of the container 60 allows for the insertion of kibble or treats and the secure closure of the container with a latch 64. The container 60 has a dispensing tunnel 24 to allow for the release of kibble or treats.

FIG. 13 shows a cubed container 70 with front and rear openings 72, 74 of tunnels 20 having different diameters. The diameter of the outer openings 72, 74 of the dispensing tunnels as shown in FIG. 14 determine the size of treats that can be dispensed.

FIG. 14 is a partial cross-section of the container shown in FIG. 13 with different sized lateral openings. The diameter of the anterior 80 and posterior 90 tunnels determine the size of treats that can enter and be dispensed from the tunnels. The posterior dispensing tunnel 80 is integrally molded and has a small cutout at its base 82 to allow kibble or treats to enter the tunnel. The smaller size of the entrance 82 to the posterior dispensing tunnel 80 means that only small treats or kibble 86 can enter and exit the tunnel. The anterior dispensing tunnel 90 is larger in diameter than the posterior dispensing tunnel 80 and has a slotted cutout 92 that is larger than the cutout of the posterior dispensing tunnel 82 to allow for the entrance and exit of larger kibble or treats 96.

Figure 15:
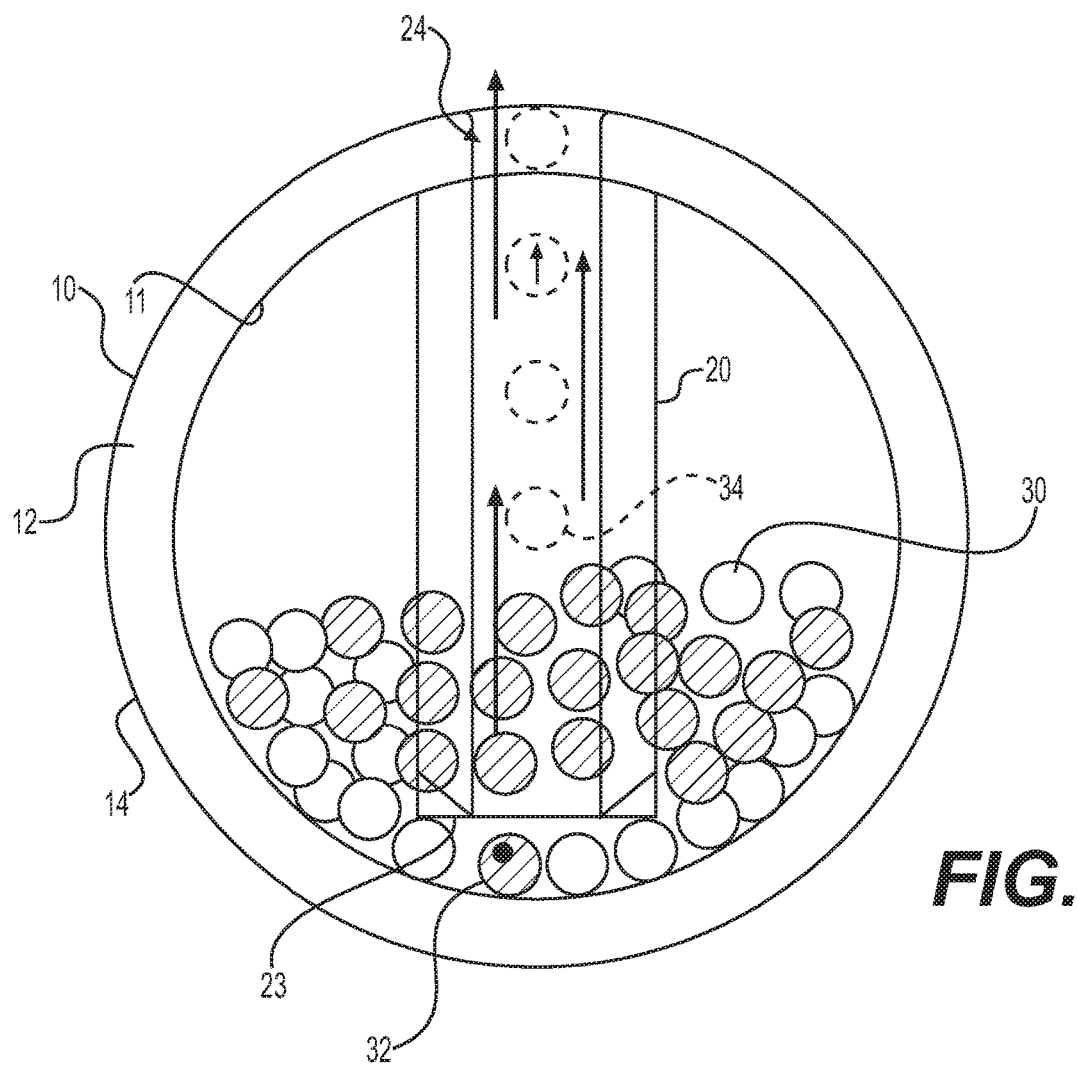
FIG. 15 is a cross sectional detail of a pet treat or kibble dispensing container with a beveled entrance to press.

FIG. 15 is a cross-sectional detail of a pet treat or kibble dispensing container with a beveled entrance to press. A strong plastic shape 10 with thick body 12 and a relatively rough surface 14 and a relatively smooth inner surface 11. An integrally molded dispenser tube 20 has an inner opening 23 and an outer opening 24. The tunnel 29 or cylinder of the tube 20 has a size slightly larger than individual treats or kibble 34 that are dispensed through the tunnel 29 and out of the outer opening 24. The inner end 21 of the tube 20 is beveled 26 to encourage one treat or kibble 32 to enter the tunnel 29 of the tube 20.

Figure 16:
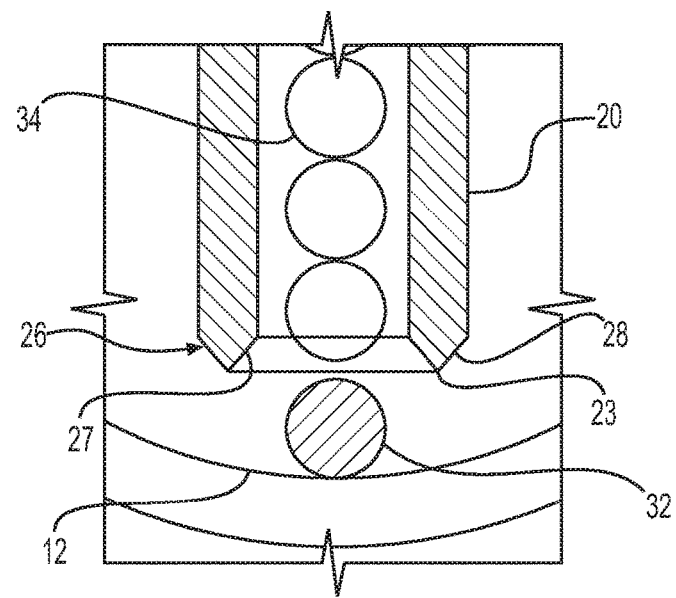
FIG. 16 is detail of a treat or kibble guided into the dispensing tunnel inner opening an inward and outward beveled tunnel inner end for centering large treats.
Figure 17:
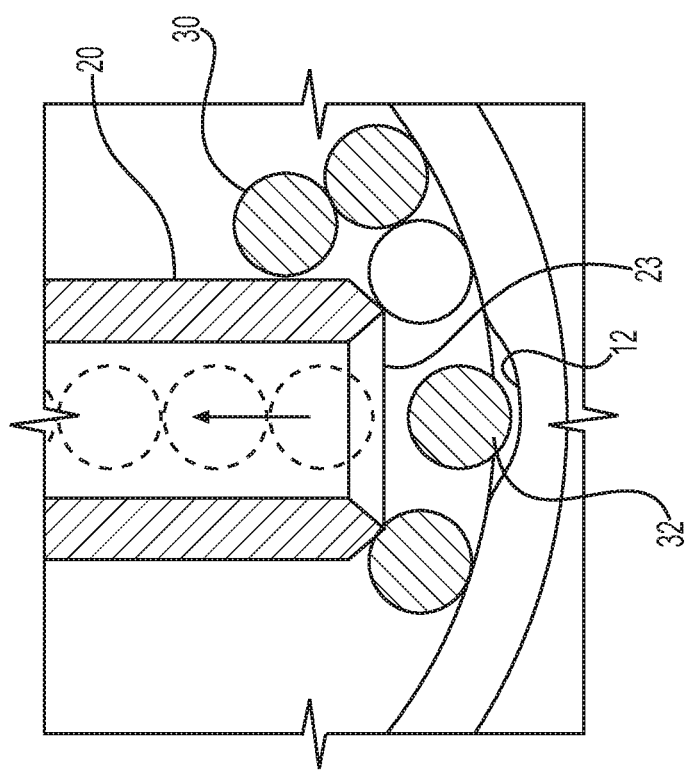
FIG. 17 is a detail of a treat or kibble aligning with the inner opening of the dispensing tunnel.

FIG. 16 is a detail of a treat or kibble located beneath a dispensing tube inner opening. The space between the inner opening 23 of the dispensing tube 20 and the concave pocket of the container 12 is slightly taller than the individual kibble or treat 32, such that the kibble or treat 32 rests squarely below the beveled 26 inner opening 23 of the tube 20. The kibble or treat 34 is slightly smaller in size than the tunnel 29 of the tube 20, allowing it to pass easily through the tube 20 when the container is flexed or turned. The inner opening 23 of tube 20 is beveled outward 27 to urge additional kibble, as shown in FIG. 17, away from the tube opening. The inner opening 23 of the tube is beveled inward 28 to divide and encourage one kibble or treat 32 to enter the tube while urging adjacent kibble 34 away from an entrance to the tube.

FIG. 17 is a detail of a treat or kibble aligning with the inner opening of the dispensing tube. A concave pocket 12 below the inner opening 23 of the dispensing tube 20 makes it such that kibble or treats 30 settle both near and beneath the inner opening 23 of the dispensing tube 20. Because of the beveled 26 inner opening 23 adjacent treats or kibble 30 are restricted from entering the concave pocket 12 until the container 10 is flexed.

Figure 18:
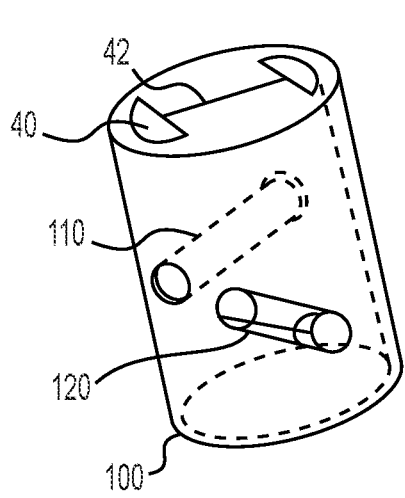
FIG. 18 is a perspective view of a cylindrical container having two dispensing tunnels and a self-sealing filling opening.

FIG. 18 is a perspective view of a dispenser cylinder showing two dispensing tubes. Each dispensing tube 110, 120 within the cylindrical dispensing container 100 has an inner opening as shown in FIG. 16 and has an outer opening as shown in FIG. 15 on different sides of the container. The two dispensing tubes 110, 120 allow for more kibble or treats to be dispensed at one time. A self-sealing filling opening 42 rests on the circular side of the cylinder.

Figure 19:
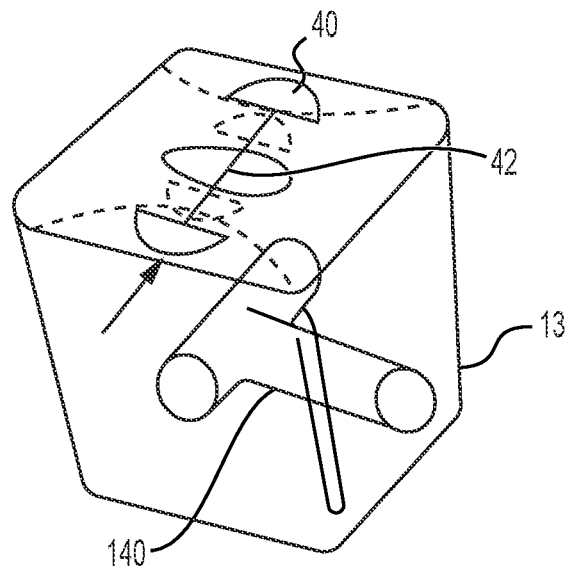
FIG. 19 is a perspective of a cubic container having a self-sealing filling opening and a branched dispensing tunnel.

FIG. 19 is a perspective of a dispenser block showing a self-sealing filling opening and a dispensing tube. The block 130 contains multiple metering tubes 140 that allow for greater provision of kibble or treats through the means shown in FIG. 2. A self-sealing filling opening 42 as shown in FIG. 5 is displayed on one side of the block.

Figure 20:
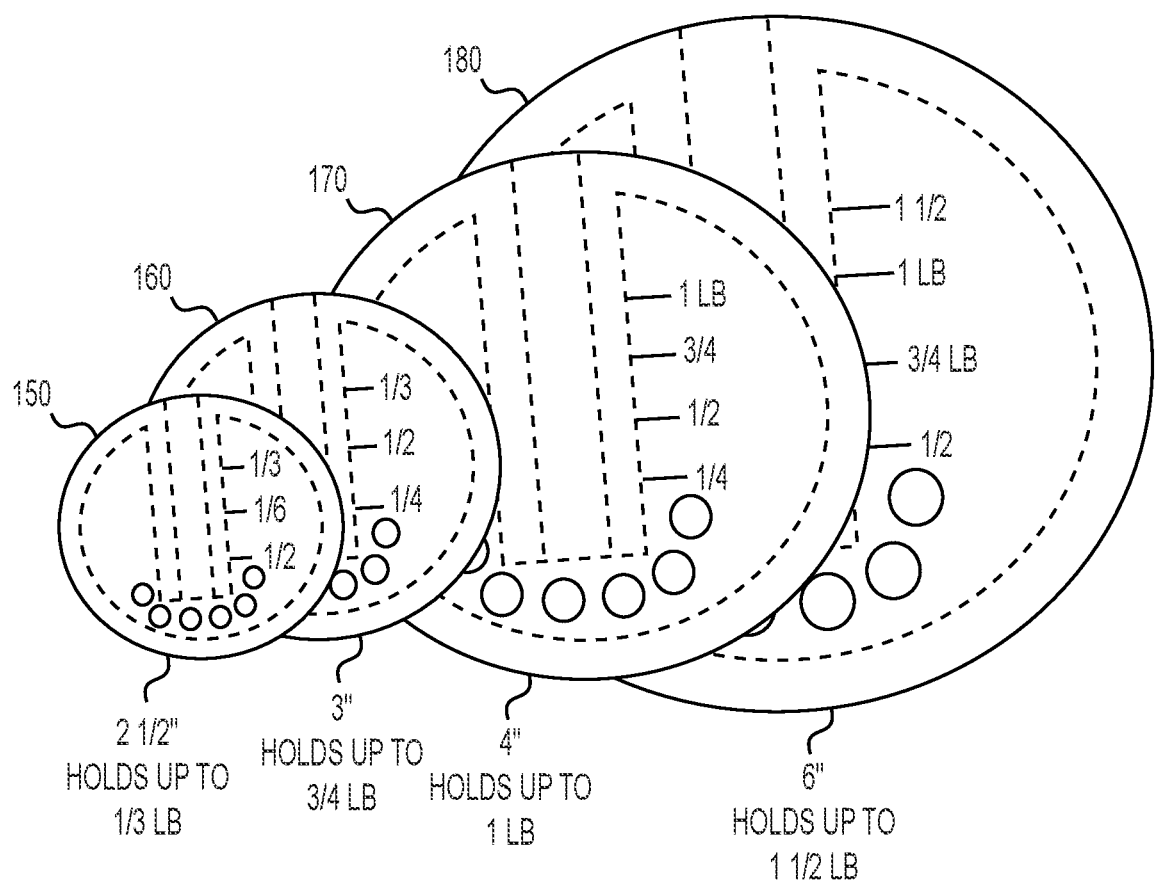
FIG. 20 shows different sizes of containers and the amount of kibble or treats they hold.
Figure 22A:
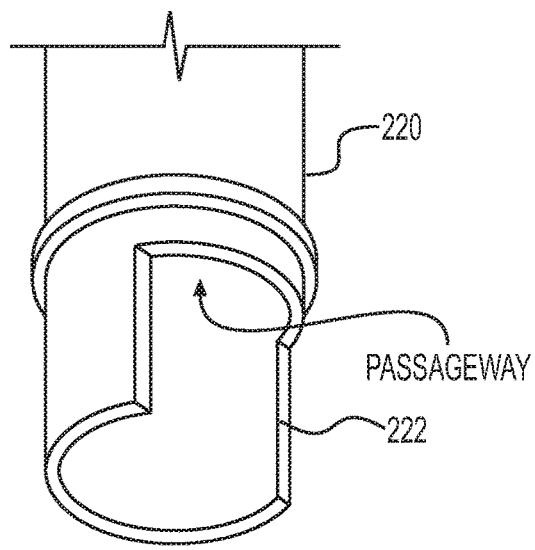
FIGS. 22A-22D show a sleeve applied to a tunnel.
Figure 22B:
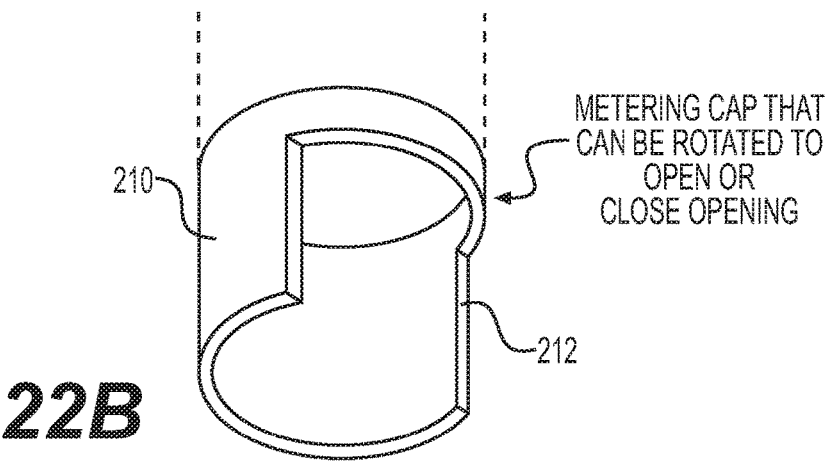
Figure 22C:
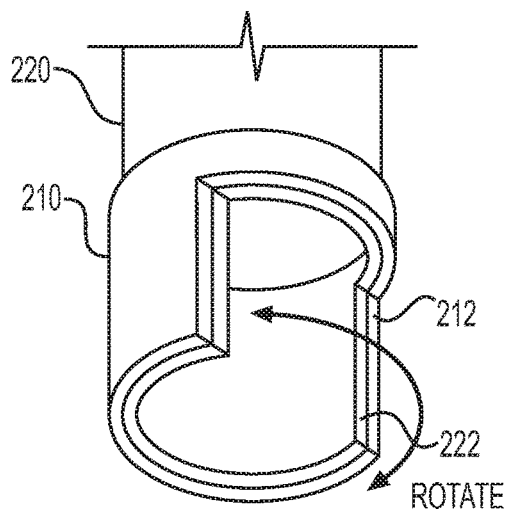
Figure 22D:
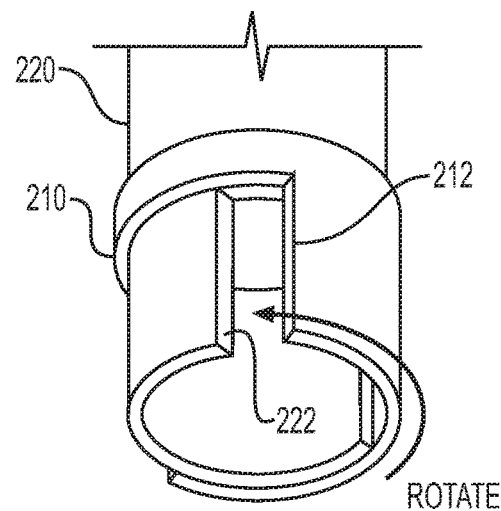

FIG. 20 shows different sizes of dispensers and the amount of kibble or treats they hold. The smallest shown dispenser 150 holds up to ⅓ lb of kibble or treats 34, the second smallest dispenser 160 holds up to ¾ lb of kibble or treats 34, the second largest dispenser 170 holds up to 1 lb of kibble or treats, and the largest dispenser 180 holds up to 1.5 lbs of kibble or treats 34.

FIG. 21 is a chart of possible choices for dogs of different sizes. The chart is organized by dog weight 200 and the corresponding food portions per day 202, 204, 206 recommended for each size of dog.

FIGS. 22A-22D show a sleeve 210 applied to a tunnel 220 having a lateral or radial opening 222 at or near its open end 224. Sleeve 210 may be rotated to adjust alignment of its partial opening 212 with radial opening 222 in tunnel 220 for controlling inflow of kibble or objects from the container to the tunnel.

Figure 23A:
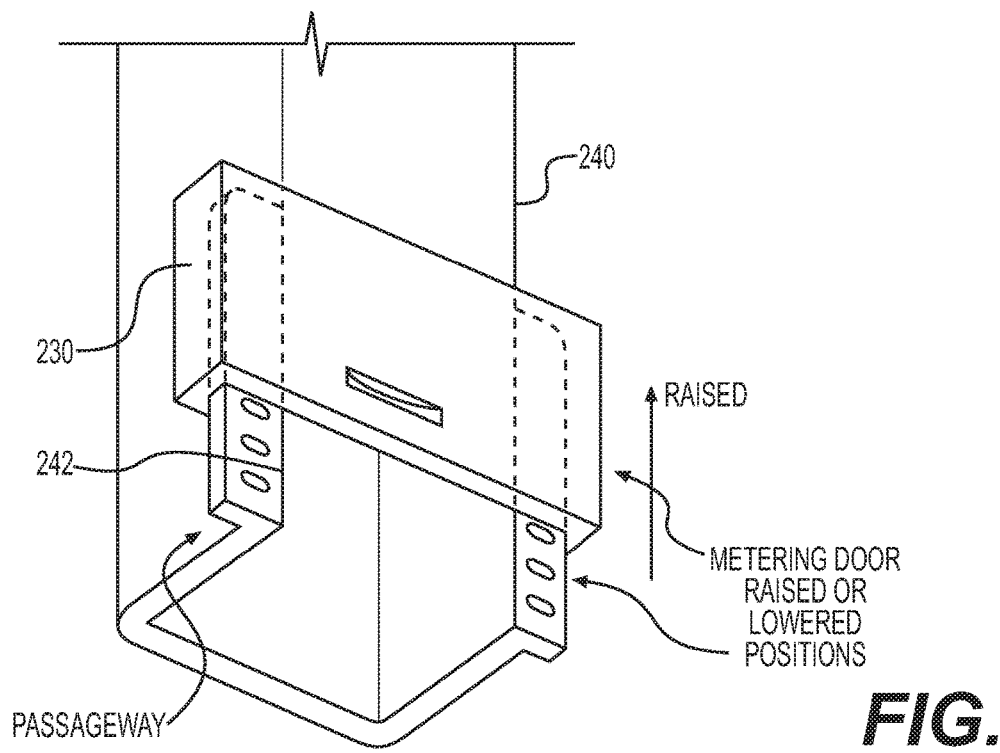
FIGS. 23A and 23B show a metering door.
Figure 23B:
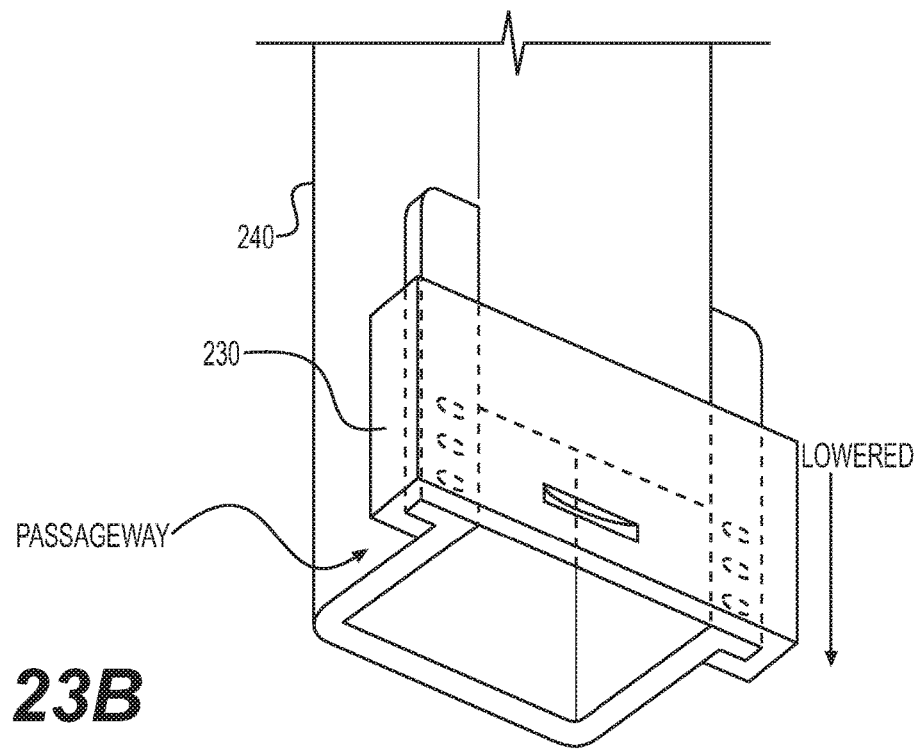

FIGS. 23A and 23B show a metering door 230 slidable on tunnel 240 to adjust a lateral opening 242 for controlling inflow of kibble or objects from the container to the tunnel.

Figure 24A:
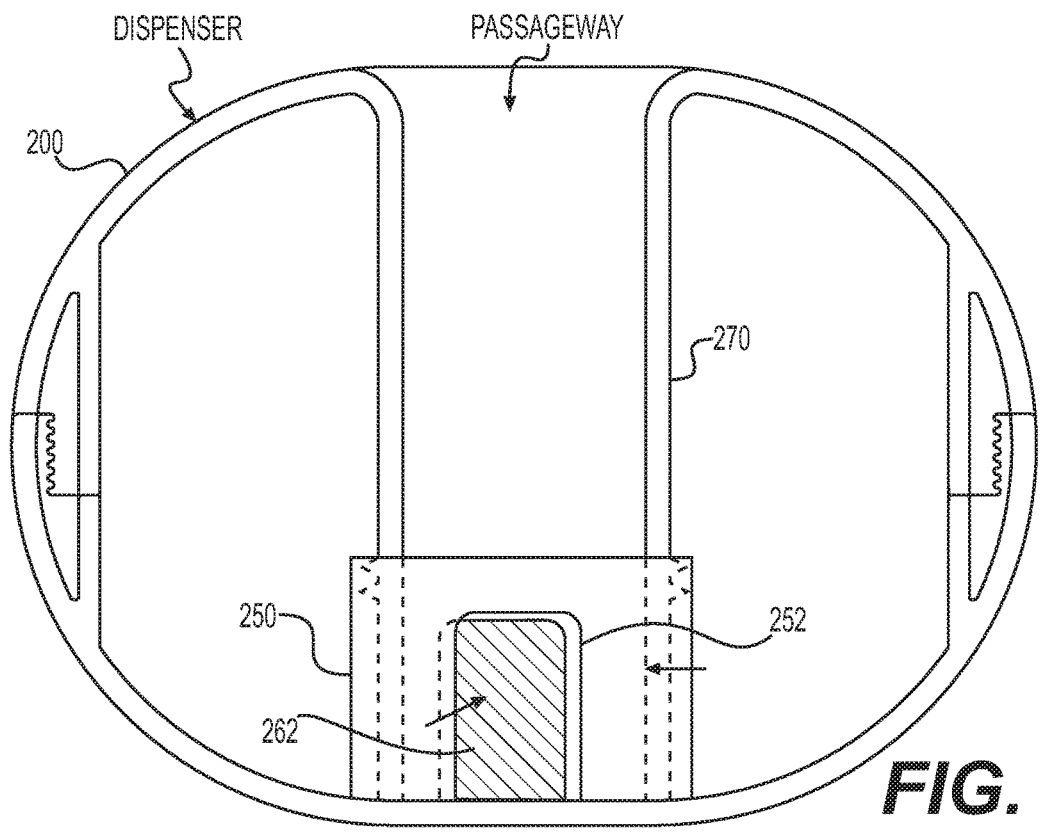
FIGS. 24A and 24B show a metering gate.
Figure 24B:
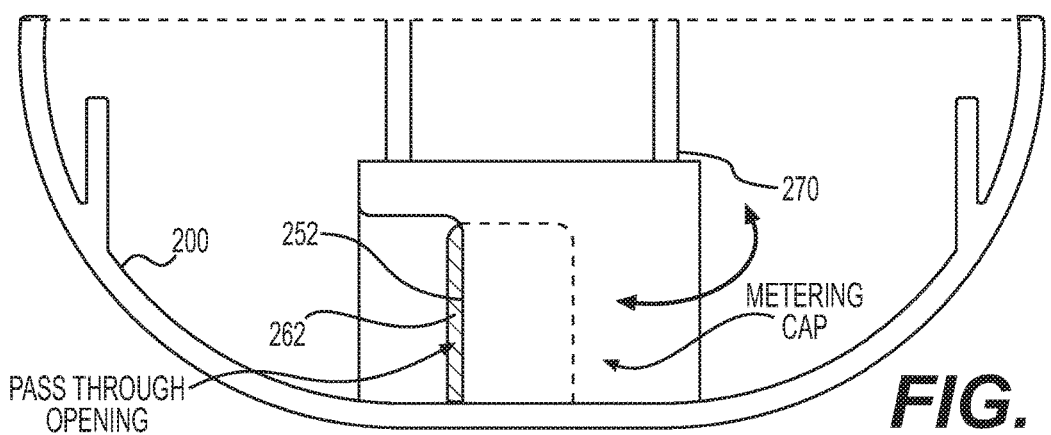

FIGS. 24A and 24B show a metering gate 250 slidable inside the container 200. Gate 250 has a complementary opening 252 to selectively control access to the opening 262 at the inner end of the tunnel 270 for controlling inflow of kibble or objects from the container to the tunnel.

While the invention has been described with reference to specific embodiments, modifications and variations of the invention may be constructed without departing from the scope of the invention, which is defined in the following claims.

We claim:

1. Apparatus comprising a dispensing container having walls with an inner side and an outer side, a tunnel within the dispensing container, the tunnel having an outer dispensing opening extending through the walls of the dispensing container and the inner side and the outer side of the walls, the tunnel having an inner receiving opening adapted for filling the tunnel from contents of the container when the container is placed in motion, whereby contents from the tunnel are dispensed by falling from the outer dispensing opening of the tunnel when the container is placed in motion;

wherein the tunnel extends across the container and the receiving opening of the tunnel is precisely spaced from an inner side of a wall of the container to limit movement of particles into the receiving opening; and wherein a movable gate is positioned in the container, and wherein the gate has a complementary opening cooperating with the receiving opening to control a size of a lumen formed by the receiving opening in the tunnel and the complementary opening of the gate.

2. Apparatus comprising a dispensing container having walls with an inner side and an outer side, a tunnel within the dispensing container, the tunnel having an outer dispensing opening extending through the walls of the dispensing container and the inner side and the outer side of the walls, the tunnel having an inner receiving opening adapted for filling the tunnel from contents of the container when the container is placed in motion, whereby contents from the tunnel are dispensed by falling from the outer dispensing opening of the tunnel when the container is placed in motion, further comprising a lateral or radial opening near the receiving opening of the tunnel, further comprising a movable cover adapted for cooperating with the lateral or radial opening and moving the movable cover to control a size of a lumen controlled by moving the cover relative to the tunnel.

3. The apparatus of claim 2, wherein the cover is a door slidable along the tunnel and partially covering and uncovering the lateral or radial opening.

4. The apparatus of claim 2, wherein the tunnel is cylindrical, and wherein the cover is a cylindrical sleeve turnable on the cylindrical tunnel near the receiving opening, and the sleeve has a complementary opening adapted for partially or fully opening a lumen between the radial or lateral opening in the tunnel and the complementary opening in the sleeve.

* * * * *